(12) United States Patent
Freeman et al.

(10) Patent No.: US 6,766,067 B2
(45) Date of Patent: Jul. 20, 2004

(54) ONE-PASS SUPER-RESOLUTION IMAGES

(75) Inventors: William T. Freeman, Acton, MA (US); Thouis R. Jones, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 628 days.

(21) Appl. No.: 09/838,811

(22) Filed: Apr. 20, 2001

(65) Prior Publication Data

US 2002/0172434 A1 Nov. 21, 2002

(51) Int. Cl.[7] .............................. G06K 9/32; G06K 9/40; H04N 11/20
(52) U.S. Cl. ....................... 382/299; 382/299; 382/255; 382/269; 348/441
(58) Field of Search .............................. 382/298, 299, 382/300, 255, 269, 266, 268, 254, 294; 348/441, 169, 561, 629, 581, 582; 358/451, 428, 529; 345/660–671, 698, 699

(56) References Cited

U.S. PATENT DOCUMENTS

| | | | |
|---|---|---|---|
| 6,263,103 B1 * | 7/2001 | Freeman et al. | 382/173 |
| 6,380,934 B1 * | 4/2002 | Freeman et al. | 345/419 |
| 6,411,333 B1 * | 6/2002 | Auld et al. | 348/441 |
| 6,434,280 B1 * | 8/2002 | Peleg et al. | 382/299 |
| 6,456,340 B1 * | 9/2002 | Margulis | 348/745 |

OTHER PUBLICATIONS

Freeman, William T.; Jones, Thouis R.; Pasztor, Egon C. Example–Based Super–Resolution, Mar./Apr. IEEE pp. 56–65.*
Freeman et al., "Learning Low–Level Vision"; IEEE International Conference of Computer Vision, 40(1) :25–47, 2000.

* cited by examiner

Primary Examiner—Amelia M. Au
Assistant Examiner—Werly Tucker
(74) Attorney, Agent, or Firm—Dirk Brinkman

(57) ABSTRACT

A super-resolution image is generated from a pixel image by first performing an initial image interpolation, creating an interpolated low resolution image. The interpolated low resolution image is then partitioned into overlapping low resolution patches. The low resolution patches are then processed in a raster scan order. For each low-resolution patch, a scaled mid band patch is generated. A search vector is constructed from pixels in the scaled mid band input patch, and pixels in an overlap region of adjacent previously predicted high band patches. A nearest index vector to the search vector is located in a training database, the nearest index vector has an associated high band output patch. The high band output patch is then combined with the interpolated low resolution patch to predict pixel values for the corresponding high resolution patch of the super-resolution image.

14 Claims, 3 Drawing Sheets

US 6,766,067 B2

ONE-PASS SUPER-RESOLUTION IMAGES

FIELD OF THE INVENTION

The present invention relates generally to processing images, and more particularly to generating super-resolution images.

BACKGROUND OF THE INVENTION

It is desired to enlarge or "zoom" images beyond the resolution at which they were sampled. Such images are said to have "super-resolution."

Polygon images derived from data structures can offer resolution independence over a wide range of scales. Edges remain sharp until one zooms in very close. However, at close ranges, undesired artifacts will appear depending on the size of the polygons. In addition, it is difficult and time consuming to construct and render resolution-independent polygons for complex, real-world objects.

In contrast, pixel images easy to acquired directly from cameras, and rendering pixel images is trivial. In addition, pixel images are rich in detail. Unfortunately, pixel images do not have the same resolution independence as polygon images. When a super-resolution pixel image is generated, blurring and loss of detail is problematic.

Therefore, there is a need for a method that achieves resolution independence when enlarging or zooming pixel-based images. In addition, many other applications in graphics or image processing can benefit from resolution independent image processing, such as texture mapping, consumer photographs, target identification, and converting small screen, analog video to large screen, HDTV data.

Super-resolution can be characterized as an image interpolation problem. The interpolation generates new pixels from existing data. A number of techniques are known for generating super-resolution pixel images.

Cubic spline interpolation is a common image interpolation method, see R. Keys "Bicubic interpolation," *IEEE Trans. Acoust. Speech, Signal Processing*, 29:1153–1160, 1981. However, super-resolution images generated by that method can still have blurred edges and loss of image details. Recent attempts to improve on cubic spline interpolation have met with limited success, see F. Fekri, R. M. Mersereau, and R. W. Schafer, "A generalized interpolative vq method for jointly optimal quantization and interpolation of images, *Proc. ICASSP*, Vol. 5, pages 2657–2660, 1998, and S. Thurnhofer and S. Mitra, "Edge-enhanced image zooming, "*Optical Engineering*," 35(7):1862–1870, July 1996.

A proprietary method performs well but highly textured regions and fine lines still suffer from blurring, see Altamira Genuine Fractals 2.0, 2000 for Adobe Photoshop. R. R. Schultz and R. L. Stevenson, "A Bayesian approach to image expansion for improved definition," *IEEE Trans. Image Processing*, 3(3):233–242, 1994, used a Bayesian method for super-resolution. However, they hypothesized the prior probability so the resulting images are blurred. A training-based approach was described by A. Pentland and B. Horowitz, "A practical approach to fractal-based image compression, *Digital images and human vision*, A. B. Watson, editor, MIT Press, 1993. However, they made no attempt to enforce the spatial consistency constraints necessary for good image quality.

Training-Based Super-Resolution

Recently, an iterative training method was described by W. T. Freeman, E. C. Pasztor, and O. T. Carmichael, "Learning low-level vision, *Intl. J. Computer Vision*, 40(1):25–47, 2000, also see U.S. patent application Ser. No. 09/236,839 "Estimating Targets using Statistical Properties of Observations of Known Targets," filed by Freeman et al, on Jan. 15, 1999. They "train" a Markov network. Their method synthesizes realistic looking textures and edges by using a large library of local image data. The local image data are learned from training images. High resolution training images are blurred and down-sampled by a factor of two in each dimension to yield corresponding low resolution images. Patches derived from these pairs of high and low resolution images are sampled to form a library of thousands of image patch pairs.

In order to reduce the amount of training data needed, the patches are pre-processed. The low resolution images are first scaled up by a factor of two in each dimension by some conventional interpolation means, such as bilinear interpolation or bicubic spline interpolation, to form the interpolated low resolution image.

The interpolated low resolution images are high-pass filtered, removing the lowest spatial frequency components, to obtain the mid band images. The interpolated low resolution images are also subtracted from the corresponding high resolution images, to obtain the high band images. The patches of the mid band images are contrast normalized, and the corresponding patches of the high band images are contrast normalized by that same amount. This avoids re-learning the same low to high resolution mapping for all different values of the lowest spatial frequency image components, and for all possible local image contrasts. The training data carry assumptions about the structure of the visual world, and about image degradation when blurring and down-sampling. This information can then be used when estimating the high band image. The high band image is then added to the interpolated low resolution image to form the high resolution estimated image, which is the output of the super-resolution algorithm.

In a zooming phase, an input low resolution image is preprocessed the same way as the training patches. However, the local image information is not sufficient to predict the missing higher frequencies for each input patch. Therefore, spatial consistency between high band patch selections at adjacent patch locations is taken into account by a Markov network.

From the training data, their method finds a set of d candidate high band patches for each input mid band image patch. A d×d compatibility matrix is computed for each pair of adjacent high band patches. The compatibility matrix indicates consistency between the adjacent high band patches in a region of overlap. The computational cost of this operation, in terms of multiplies, is $d^2 2NK$, where N is the number of pixels in a high band patch, assuming a two-pixel overlap between high band patches, and K is the number of patches in the image. The optimal high band patch at each location is determined by applying multiple iterations of Bayesian belief propagation. Here, the computational cost per iteration is $O(d^2 K)$. Needless to say, processing images by this method is very time consuming.

Therefore, there is a need for a method that can provide quality super-resolution images in a reasonable amount of time, for example, during a single processing pass without any iteration.

SUMMARY OF THE INVENTION

The invention provides a super-resolution image that is generated from a pixel image. The images are first partitioned into respective overlapping interpolated low resolution patches and corresponding high resolution patches. The interpolated low resolution patches are then processed in a raster scan order.

For each interpolated low-resolution patch, a mid band input patch is generated. A search vector is constructed from pixels in the mid band input patch, and pixels in an overlap region of adjacent previously predicted high band patches.

A nearest index vector to the search vector is located in a training database, and the nearest index vector has an associated high band output patch. The high band output patch is then combined with the interpolated low frequency patch to predict pixel values for the corresponding high resolution patch of the super-resolution image.

DETAILED DESCRIPTION OF THE PREFERRED EMBODIMENT

Image Partitioning and Processing Order

Figure 1:
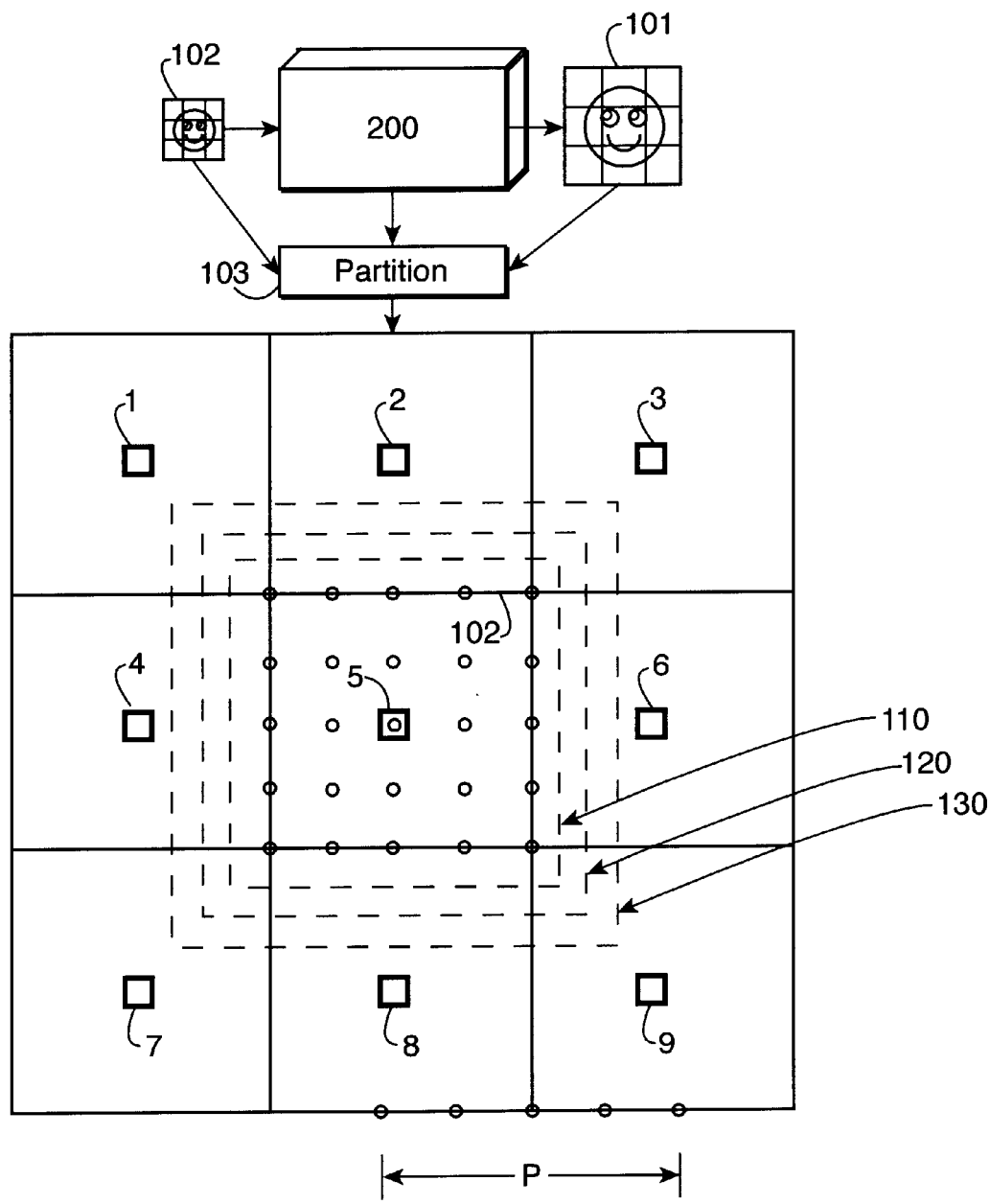
FIG. 1 is a block diagram of a pixel image partitioned into patches.

As shown in FIG. 1, our invention generates a super-resolution (high resolution) pixel image 101 from an input (low resolution) pixel image 102 in a single processing pass 200, i.e., our invention a non-iterative process. As shown in FIG. 1, we partition 103 the low and high resolution images 101-102 as follows.

After some initial pre-processing, described below, each low resolution image 102 is partitioned into an array of overlapping patches of pixels centered on pixels 1–9 spaced at coordinates (X, Y) that are P pixels apart, for example five.

For the high resolution image 101, a high band patch 110 overlaps adjacent patches by one pixel. For an initial doubling factor, i.e., twice the resolution, the high band patches 110 are M×M (e.g., 5×5) pixels. For the low resolution image 102, an interpolated low resolution patch 120 has N×N (e.g., 7×7) pixels overlapping all of its adjacent patches by three pixels.

The overlap is used to construct a search vector. The overlap guarantees consistency between a new high band patch and previously determined adjacent high band patches. For higher doubling factors, the patches 130 have 9×9 pixels. These sizes do well to capture small details in the images. It should be understood, that the patches can have other sizes and shapes to meet desired quality and processing constraints.

The resolution of state of the art digital cameras is measured in millions of pixels. Therefore, an image can have tens of thousand of patches. The training database stores hundreds of thousand of patches.

The patches of the images are processed sequentially, e.g., in a raster scan order beginning with the top row, left-to-right, i.e., the patch centered on pixel 1, and then patches centered on pixels 2–9. High band patch compatibilities are determined for adjacent patches that are already predicted, i.e., patches 1, 2 and 4 above and to the left of patch 5, in the preferred raster-scan order. It should be noted that other sequential scanning orders can be used in which case the predicted adjacent patches can be different. For example, in a reverse raster scan, the predicted neighbors would be to the right and below. It should be noted that patches on the edge of the image have fewer adjacent patches, and the first patch has none.

As described below, we pre-structure the training database to store pairs consisting of an index vector and a corresponding high band output patch. We also construct 300 the search vector from the low resolution patch and overlap portions of adjacent predicted high band patches. We convert the low resolution image 102 to the high resolution image, on a patch-by-patch basis. For each mid band patch, we select a compatible high band output patch using the search vector to locate a nearest index vector in the training database. The construction of the search vector is described below. This is all done in the single processing pass 200. This simplification avoids the need to compute the compatibility matrices and the iterative belief propagation of the prior art, with negligible reduction in image quality.

Detailed Super-Resolution Method Steps

Figure 2:
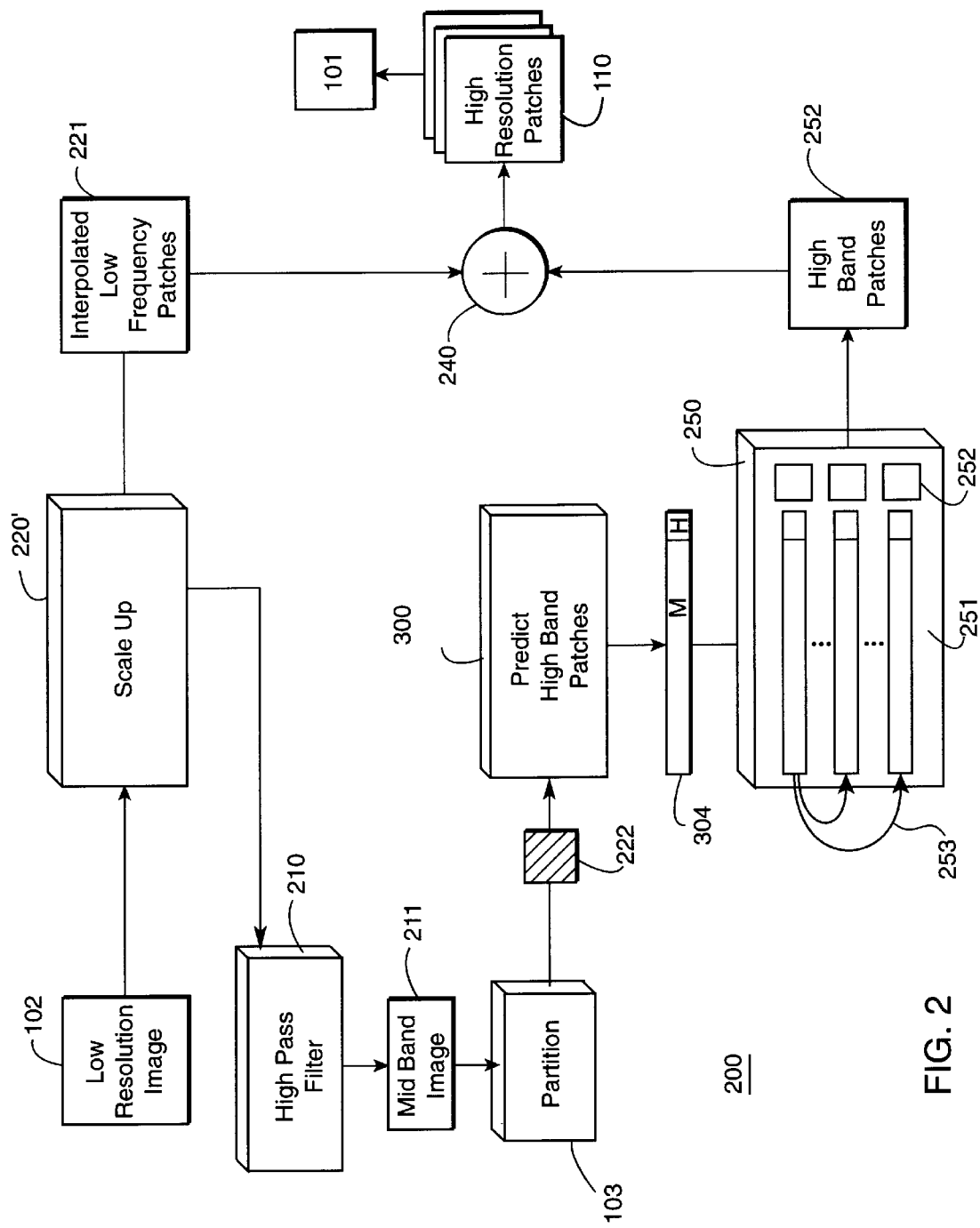
FIG. 2 is a flow diagram of a super-resolution method according to the invention.

As shown in FIG. 2, our single pass super-resolution method 200 determines missing high band content 252 for the super-resolution image 101 during a sequence of local (patch-based) predictions 300. As stated above, the low resolution input image 102 is partitioned 103 into low resolution patches 120 that are then processed in the selected sequential order.

In a pre-processing step, the input image 102 is up-scaled 220. The up-scaling 220 can be done by cubic spline interpolation. To alleviate edge artifacts due to the cubic spline interpolation, the input image is padded by four pixels on each side by replicating border pixels. This padding is removed later. Next, the interpolated image is high-pass filtered 210 to remove low frequency details. The filtering and scaling produces a mid band image 211 that can now be partitioned 103, as described above, and processed on a per patch basis.

For each mid band input patch 222, a search vector 304 is generated. The vectors can be generated by linearly arranging the pixels of the contrast normalized mid band patches in a raster scan order, and appending a scaled version of the pixels of previously predicted adjacent high band patches 329. Each search vector has components derived from mid band and high band images.

The search vector 304 is used to determine a nearest index vector 251 in the training database 250, and the corresponding high band output patch 252 is selected from the training database 250. The selection is based on the local mid band (M) input patch 222, as well as overlapping portions (H) of adjacent, previously determined high band patches 120.

The interpolated low resolution image 220 is also used without filtering to produce interpolated low resolution patches 221. The interpolated low resolution patch is combined 240 with the corresponding high band output patch 252 to form the high resolution patch 110 that is inserted in the high resolution image 101.

Prediction

Figure 3:
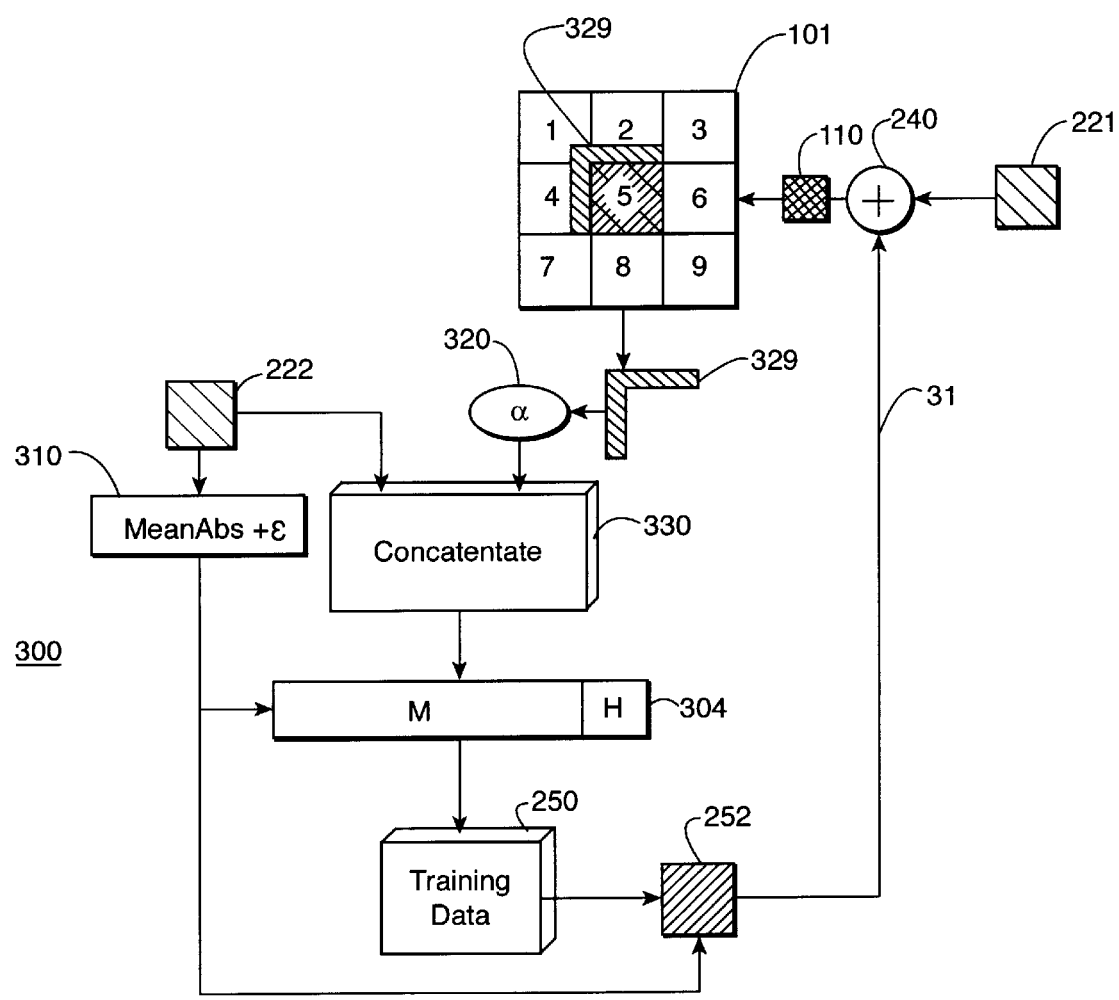
FIG. 3 is a flow diagram of generating search vectors and selecting high frequency patches from a training database.

As shown in FIG. 3, local low and high frequencies detail of the images 101-102 are used to "predict" 300 the high frequencies 252 missing from the low frequency patch 221 to determine the high resolution patch 110. The super-resolution patch 110 of our method is the sum 240 of the interpolated low resolution patch 221 and the predicted high band output patch 252.

Search Vector

The search vector 304 is generated by concatenating 330 the serialized pixels of the mid band input patch (M) 222 with serialized pixels of an overlap region (H) 329 in predicted high band patches 1, 2, and 4 adjacent to the high band patch 110 to be determined, e.g., patch 5 in the scanning order.

The L∞ nearest index vector is selected using a searching method based on S. A. Nene and S. K. Nayar, "A simple algorithm for nearest neighbor search in higher dimensions," *IEEE Pattern Analysis and Machine Intelligence*, 19(9): 989–1003, September 1997. We adapt their method to a L∞-norm. Each index vector 251 in the training database 250 is associated with a high band output patch 252 containing the prediction for that vector.

As an enhancement, the index vectors 251 in the training database 250 can be pre-processed so that similar vectors are linked by pointers 253. Thus, should the search fail on a particular index vector, other likely nearest neighbor vectors can directly be located.

Consistency Weighting

The search vector 304 is multiplied 320 by a consistency weighting factor $\alpha$ to adjust the relative importance of the mid band input patch 222 versus the previously predicted adjacent high band patches 110 when searching for a match in the training database 250. The parameter $\alpha$ controls the tradeoff between matching the input patch 222 and finding the high band output patch 252 that is compatible with adjacent high band patches 110. For a quality super-resolution image, we preferred that $$\alpha = 0.1 \frac{M^2}{2N-1},$$

where M and N are defined above.

Contrast Normalization

The super-resolution method 200 according to our invention operates under the assumption that a predictive relationship between frequency octaves in pixel intensity values is independent of contrast. Therefore, our method normalizes the pixel intensities in the search vector 304 by a mean absolute value 310 of the mid band patch 222, across all of color (RGB) values, plus some small $\epsilon$ to avoid overflow. The contrast normalization is undone on the high band output patch 252 that is combined 240 with the interpolated low resolution image patch 221 to form the high resolution patch 110 for the super-resolution image 101.

Training

The training database 250 for our super-resolution method 200 is built from mid band and high band pairs of training patches. The pairs of patches are generated by partitioning a set of training images and processing the partitioned patches as described above. The spatially corresponding M×M and N×N patches are taken from image pairs at a set of sampling locations, usually every pixel. The low resolution image is derived from the high resolution image by first convolving with a [0.25 0.5 0.25] blurring filter in each dimension and then sub-sampling on the even pixel indices.

In effect, the present invention provides super-resolution pixel images at a reduced computational costs without a substantial degradation of image quality. Pseudo code for the method is attached in an Appendix.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

PREDICT SUPER-RESOLUTION IMAGE

```
Super-resolution(Image) =
    PredictorImage = ScaleUp(High-pass(Image))
    PredictedImage = ScaleUp(Image) + PredictHighFrequencies
        (PredictorImage)
Return PredictedImage
```

FILTERING OPERATIONS

```
High-pass(Image) = Image − ScaleUp(ScaleDown(Image))
Band-pass(Image) = ScaleUp(High-pass(ScaleDown(Image)))
```

In pseudo code:

PREDICT HIGH FREQUENCY INPUT PATCHES

```
PredictHighFrequencies(Input) = Initialize HighFrequencyImage to 0
    For each (X, Y) in (0 . . . Width, 0 . . . Height) by P
        LowFreqPatch = Subimage(Input, X, Y, M)
        OverlapRegion = Overlap(HighFrequencyImage, X, Y, N,
            N − P)
        HighFreqPatch = Predict(LowFreqPatch, OverlapRegion)
        HighFrequencyImage += HighFreqPatch
Return HighFrequencyImage
```

PREDICT HIGH FREQUENCY OUTPUT PATCHES

```
Predict(LowFreqPatch, OverlapRegion =
    ContrastNormalize = mean(abs(LowFreqPatch)) + ϵ
    LowFreqPatch /= ContrastNormalize
    OverlapRegion *= ((α) / ContrastNormalize)
    SearchVector = Concatenate(LowFreqPatch, OverlapRegion)
    HighFreqPatch = BestMatch(SearchVector)
Return (ContrastNormalize * HighFreqPatch)
```

CONSTRUCT TRAINING DATABASE

```
AddImageToTrainingSet(Image) =
    Band-passImage = Band-pass(Image)
    High-pass(Image) = High-pass(Image)
    For each sampling location (X, Y)
        LowFreqPatch = Subimage(Band-passImage, X, Y, M)
        HighFreqPatch = Subimage(High-passImage, X, Y, N)
    AddPatchesToSet(LowFreqPatch, HighFreqPatch)
```

We claim:

1. A method for generating a super-resolution image from a pixel image, comprising:

partitioning the pixel image into a plurality of overlapping low resolution patches;

partitioning the super-resolution image into a plurality of corresponding overlapping high resolution patches;

processing the low resolution patches in a sequential order, the processing for each low-resolution patch comprising:

generating a scaled mid band patch from the low resolution patch;

constructing a search vector from pixels in the scaled mid band input patch, and pixels in an overlap region of adjacent previously predicted high band patches;

locating a nearest index vector to the search vector in a training database, the nearest index vector having an associated high band output patch; and combining the high band output patch with the interpolated low resolution patch to predict pixel values for the corresponding high resolution patch of the super-resolution image.

2. The method of claim 1 further comprising:

centering the overlapping patches on pixels spaced at coordinates (X, Y) that are P pixels apart.

3. The method of claim 1 wherein the high resolution patches overlap adjacent patches by one pixel and low resolution patches overlap adjacent low resolution patches by three pixels.

4. The method of claim 1 further comprising:

linearly arranging the pixels in the scaled mid band input patch and the pixels in the overlap region of the adjacent previously predicted high band patches to construct the search vector.

5. The method of claim 1 further comprising:

weighting the pixels of the mid band input patch by a weighting factor; and normalizing contrast of the pixels of the search vector by a normalization factor.

6. The method of claim 5 wherein the weighting factor is $$0.1 \frac{M^2}{2N-1},$$

and where M and N are the sizes of the high and low resolution patches in terms of pixels.

7. The method of claim 5 wherein the weighting factor is substantially a mean absolute value of the low resolution image across all of color values.

8. The method of claim 5 further comprising:

removing the normalizing on the high band output patch.

9. The method of claim 1 wherein the index vectors and the associated high band output patches are built from band-pass and high-pass pairs of training patches.

10. The method of claim 9 wherein the index vectors and the associated high band output patches are contrast normalized.

11. The method of claim 1 wherein the sequential order is a raster scan order.

12. The method of claim 2 wherein P is five.

13. The method of claim 1 wherein the nearest index vector is located using a L∞-norm.

14. The method of claim 1 wherein similar index vectors in the training database are linked.

* * * * *